Sept. 13, 1960 C. H. HERR, JR 2,952,495
SHAFT MOUNTING
Filed March 3, 1958 2 Sheets-Sheet 1
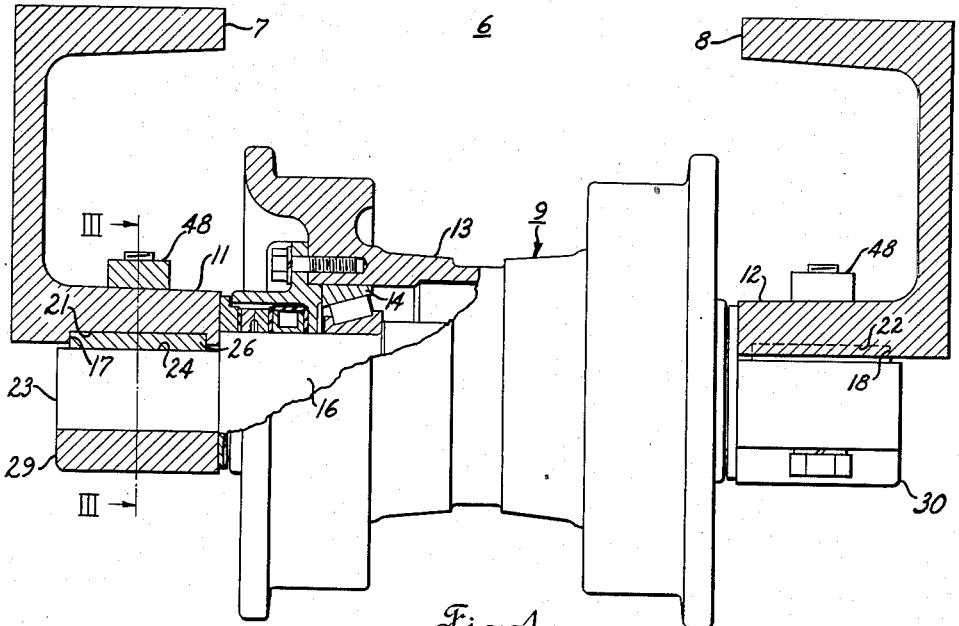
Fig. 1
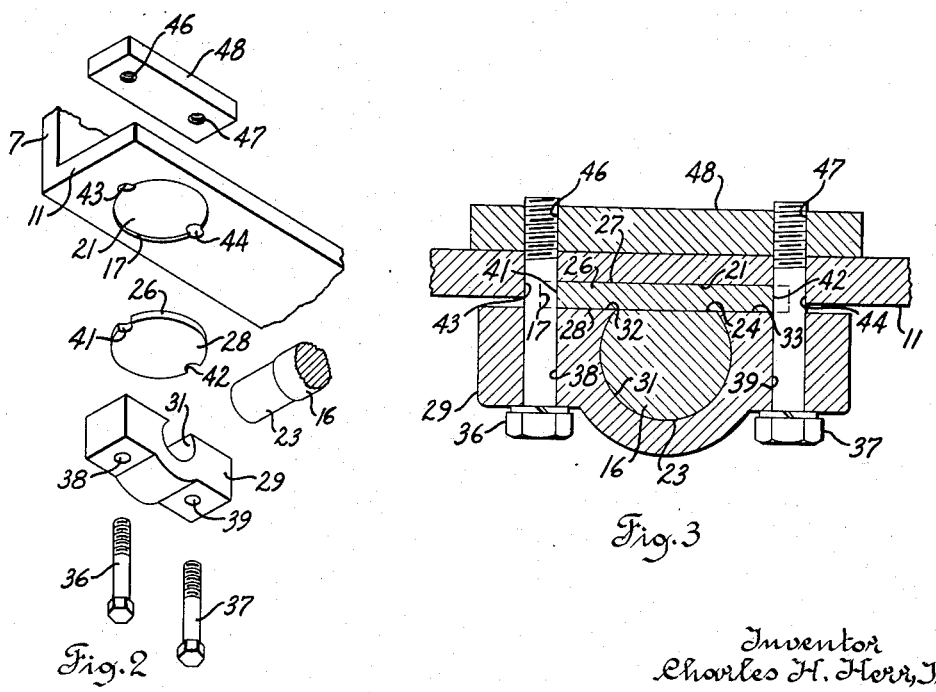
Fig. 2
Fig. 3
Inventor
Charles H. Herr, Jr.
by
Attorney Sept. 13, 1960  C. H. HERR, JR  2,952,495
SHAFT MOUNTING
Filed March 3, 1958  2 Sheets-Sheet 2

Inventor
Charles H. Herr, Jr.
Attorney

United States Patent Office 2,952,495
Patented Sept. 13, 1960

2,952,495

SHAFT MOUNTING

Charles H. Herr, Jr., Springfield, Ill., assignor to Allis-Chalmers Manufacturing Company, Milwaukee, Wis.

Filed Mar. 3, 1958, Ser. No. 718,564

3 Claims. (Cl. 308—15)

This invention relates generally to a structure for connecting a shaft onto a support member which because of manufacturing variations does not present a dimensionally flat mounting surface and is more particularly concerned with providing a structure for connecting a truck wheel shaft onto the truck frame assembly of the self-laying endless track unit of a crawler tractor.

In truck roller installations for crawler tractors, as shown for instance in U. S. Patent 2,568,897 issued September 25, 1951 to E. F. Norelius, wherein a stationary truck wheel supporting shaft is secured at its opposite ends to the underside of the lower flange of a pair of longitudinally extending commercially rolled section channel members of a truck frame, it is well known that the mounting surfaces presented by the underside of the lower flanges of these rolled section channel members are usually not coplanar. This condition is due principally to the tolerances allowed in the manufacturing of rolled channel stock and to distortions introduced into the channel members during the fabrication of the truck frame.

In rigidly fastening the ends of the truck wheel shaft against the noncoplanar mounting surfaces of the lower flanges the shaft is in most instances subjected to bending which tends to induce undesirable stresses which has an adverse affect on fatigue life of the shaft and the deflection of the shaft during the mounting operation often causes the truck roller antifriction bearings to become abnormally loaded resulting in wear at an accelerated rate. It has also been found that very often due to dimensional irregularities in the mounting surface of the channel member the contact area between the bearing surface of the truck wheel shaft and the bearing surface of the channel member is less than optimum which causes the contact area to break down and the connection to work loose thereby creating an additional maintenance problem.

It is, therefore, generally the object of this invention to provide an improved shaft mounting structure which will take care of the hereinbefore mentioned difficulties and disadvantages in an entirely satisfactory manner.

It is more specifically the object of this invention to provide an improved shaft mounting structure wherein a shaft may be fixedly connected on a support member presenting a dimensionally irregular mounting surface without subjecting the shaft to bending.

It is a further object of this invention to provide an improved mounting structure for truck roller shafts which will provide a bearing surface of optimum contact area between the shaft and the noncoplanar mounting surfaces of the truck frame assembly.

A further object of this invention is to provide an improved truck wheel shaft mounting structure which eliminates deflection of the shaft during mounting, affords satisfactory service life to the shaft, is simple to assemble and disassemble and is economical to manufacture.

It is a further object of this invention to provide an improved truck wheel shaft mounting structure wherein a coplanar bearing surface is provided on the otherwise noncoplanar mounting surfaces of a track frame assembly upon which is mounted a truck wheel shaft in load bearing relationship thereto.

These and other objects and advantages of this invention will become apparent to those skilled in the art when the following detailed description is read in conjunction with the accompanying drawings in which:

Fig. 1 is a front elevation partially in section showing one embodiment of a truck wheel installed on the truck frame of the self-laying track unit of a crawler tractor;

Fig. 2 is a completely exploded view of the components of the shaft mounting structure for one end of the shaft shown in Fig. 1;

Fig. 3 is a sectional view taken along line III—III in Fig. 1;

Figures 4, 5:
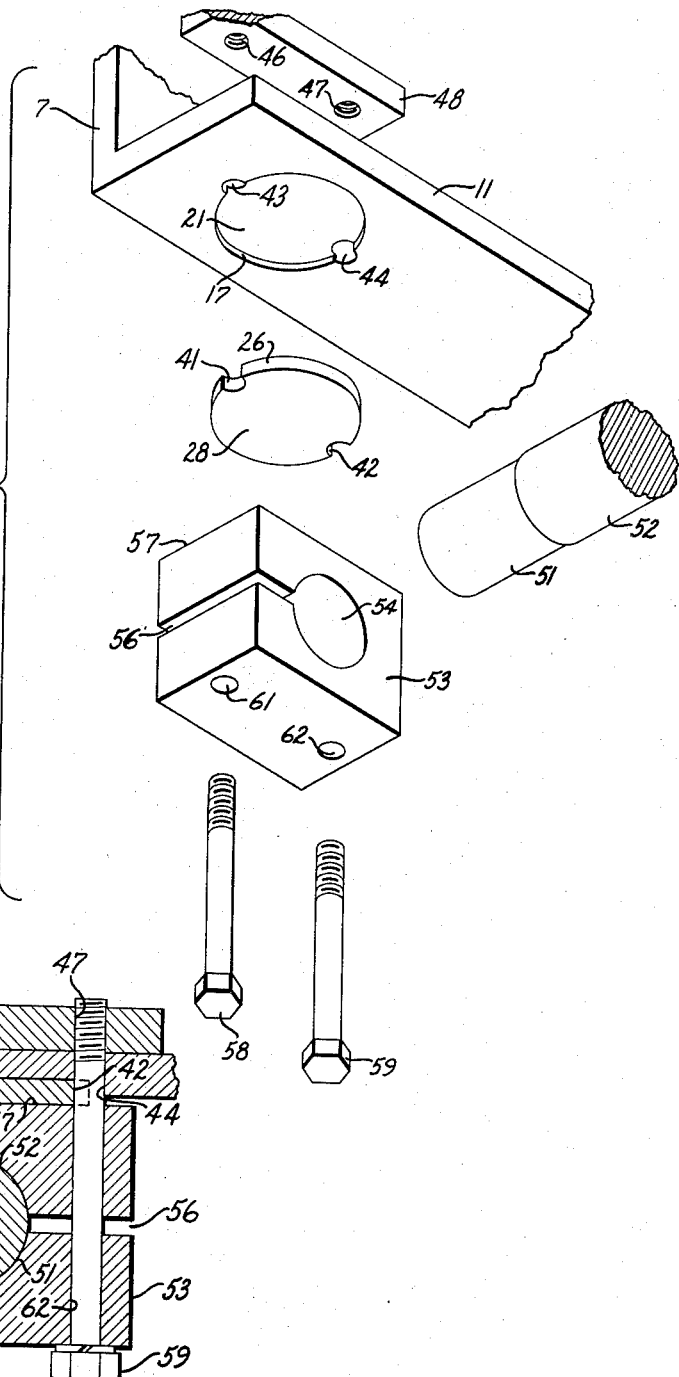
Fig. 4 is a completely exploded view of the components of another embodiment of the shaft mounting structure for one end of the shaft.
Fig. 5 is a section view of the embodiment of Fig. 4 which is similar to the sectional view of Fig. 3.

For purposes of describing this invention it is believed unnecessary to show in detail the entire truck frame assembly for the self-laying track unit of a conventional type of crawler tractor since the construction and design are well understood in the art.

Referring to Fig. 1, the conventional truck frame assembly, a portion of which is indicated generally at 6, includes a pair of channel members 7 and 8 of commercially rolled channed stock, which extend longitudinally and are rigidly interconnected in spaced parallel relation to each other. The channel members 7 and 8 serve as support members and provide a mounting portion on the underside of the lower flanges 11 and 12 for the truck wheel assembly 9. Truck wheel assembly 9 is of conventional design and construction and includes a housing 13 which is rotatably mounted on suitable antifriction bearings 14 on the truck wheel shaft 16. Shaft 16 is part of the shaft assembly that includes brackets 29 and 30 which nonrotatably connect the opposite ends of shaft 16 respectively to the underside of the lower flanges 11 and 12 of the channel members 7 and 8 of the truck frame assembly 6. A pair of transversely spaced recesses 17 and 18 are formed respectively in the underside of the lower flanges 11 and 12 of the channel members 7 and 8. Recesses 17 and 18 are of circular shape and are to be formed by suitable machining techniques so that the bottoms of recesses 17 and 18 present a pair of flat coplanar bearing surfaces 21 and 22. It is not intended, however, to limit the invention as to the shape of the recesses except that they are to present flat coplanar bottoms.

It will also be apparent that to achieve coplanar bottom surfaces at 21 and 22 the depth of the several recesses may vary. This variation, of course, is due to the irregularities in the standard rolled channel members 7 and 8 and also to any slight misalignment of the truck frame assembly that results in the bottom surface of flange 11 being disposed noncoplanar with respect to the bottom surface of flange 12. It is well known that some misalignment is unavoidable during fabrication of this type of truck frame assembly. Accordingly, it is preferred to machine the recesses into the bottom flange after the channel members have been rigidly interconnected in order to insure a pair of coplanar load bearing surfaces 21 and 22.

Referring to Figs. 1, 2 and 3, the details of the mounting structure for connecting the shaft 16 onto the truck frame assembly 6 will be described for one end of the shaft only; and it is to be understood that this description will be equally applicable to the mounting structure for the opposite end of shaft 16.

An attaching portion 23 is formed on the end of shaft 16 and is of a lesser diameter being provided with a flat bearing surface 24 formed thereon as by milling. Bearing surface 24 presents a plane which is parallel to the axis of shaft 16. In the assembled condition, as best shown in Fig. 3, bearing surface 24 and the axis of shaft 16 are both parallel to the plane of bearing surface 21 of recess 17. A shim or adapter element 26 is flat, of uniform thickness and is circular in shape having a diameter slightly smaller than but complementary to the diameter of recess 17. Adapter element 26 is releasably retained in recess 17 and presents opposite bearing faces 27 and 28, face 27 being disposed in thrust transmitting relationship with bearing surface 21. Bearing surface 24 of shaft 16 is held in thrust transmitting relationship with bearing surface 28 by means of a C-shaped bracket 29 which presents a cylindrical concave inner surface 31 fitting about the mounting portion 23 of the shaft 16 and also presents a pair of coplanar flat surfaces 32 and 33 which are generally coplanar with bearing surface 24 and are disposed in abutting relationship to the bearing face 28 of adapter element 26. Element 26 is of sufficient thickness so that bearing surface 28 is raised slightly above the dimensionally irregular surface of flange 11 surrounding recess 17 in order to prevent interference between bracket 29 and the flange surface. A pair of bolts 36 and 37 are piloted respectively through bores 38 and 39 provided in bracket 29; through the oppositely spaced transverse cylindrical notches 41 and 42 provided on the circumference of adapter element 26 (best shown in Fig. 2); through oppositely spaced bores 43 and 44 provided in bottom flange 11 of channel member 7; and thence into threaded engagement respectively with the threaded bores 46 and 47 of the nut block 48 which is disposed in overlaying relationship to the upper side of lower flange 11. Considering this construction from a general point of view it will be seen that surface 21 serves as a first bearing surface and surfaces 24, 32 and 33 together serve as a second bearing surface disposed in spaced relationship from the first bearing surface. It will also be apparent that bolts 36 and 37 and nut block 48 in effect serve as a releasable fastening means associated with bracket 29 and channel member 7 for maintaining shaft 16, adapter element 26 and channel member 7 in complementary load bearing relationship to one another; and that bracket 29, bolts 36 and 37 and nut block 48 comprise a connecting means associated with shaft 16 and channel member 7 for maintaining shaft 16, adapter element 26 and channel member 7 in complementary load bearing relationship to one another.

Referring specifically to Fig. 2, this is an exploded view of the embodiment of Figs. 1 and 3 and illustrates the shaft mounting structure for one end of truck wheel shaft 16 in a completely disassembled condition. Bolts 36 and 37 have been removed from threaded engagement with the bores 46 and 47 of the nut block 48, have been withdrawn from bores 43 and 44 of the lower flange 11 and from bores 38 and 39 of bracket 29. Bracket 29 has been separated from engagement with the adapter element 26 which has been removed from recess 17, and the mounting portion 23 of shaft 16 has been withdrawn from surface 31 of bracket 29.

Referring to Figs. 4 and 5, a second embodiment of the invention is illustrated which differs from the embodiment of Figs. 1, 2 and 3 only in the design and construction of the attaching portions of the truck wheel shaft and of the brackets which are used to connect the attaching portions to the respective channel members.

The details of the mounting structure for connecting the truck wheel shaft 52 (a portion of which is best shown in Fig. 5) onto the truck frame assembly 6 will be described for one end of the shaft only, and it is to be understood that this description will apply equally to the mounting structure for the opposite end of the shaft. An attaching portion 51 is provided on the end of truck wheel shaft 52 and is of a somewhat smaller diameter than the central portion of the shaft. Bracket 53 is produced from a rectangular block having a bore 54 extending from end to end which is of a diameter slightly larger than but complementary to that of the mounting portion 51. A slot 56 is provided in bracket 53 which extends the length of one side and extends inwardly to communicate with bore 54. A flat bearing surface 57 is provided on the top side of bracket 53 and is in a plane which is parallel to the axis of shaft 52. In the assembled condition, as best shown in Fig. 5, the mounting portion 51 of shaft 52 is received into bore 54. The bearing surface 57 of bracket 53 and the axis of shaft 52 are both parallel to the plane of bearing surface 21 on the bottom of recess 17. Adapter element 26 is retained in recess 17 as hereinbefore described in connection with Figs. 1 through 3, and bearing faces 27 and 28 of element 26 are juxtaposed respectively in thrust transmitting relation with bearing surfaces 21 of recess 17 and bearing surface 57 of bracket 53. Bolts 58 and 59 are piloted repectively through bores 61 and 62 provided in bracket 53; through the transverse notches 41 and 42 of adapter element 26; through bores 43 and 44 provided in lower flange 11; and thence into threaded engagement with bores 46 and 47 provided in nut block 48. As bolt 59 is drawn tight, slot 56 tends to squeeze together thereby bringing the surface of the bore 54 into intimate gripping engagement with the mounting portion 51 of shaft 52. Considering the foregoing construction from a general point of view it will be seen that surface 21 serves as a first bearing surface which is disposed in spaced parallel relationship from surface 57 which serves as a second bearing surface. It will also be apparent that bolt 59 cooperates with bolt 58 as both are drawn up tight to provide a releasable fastening means for rigidly maintaining bracket 53, shaft 52, adapter element 26 and channel member 7 in complementary load bearing relationship with one another; and that bracket 53, bolts 58 and 59, and nut block 48 comprise a connecting means which cooperate wtih shaft 52 and channel member 7 to rigidly maintain shaft 52, adapter element 26 and channel member 7 in complementary load bearing relationship with one another.

Referring specifically to Fig. 4, an exploded view of the second embodiment shows all of the components of the mounting structure for one end of the shaft in a completely disassembled condition. Bolts 58 and 59 have been removed from the threaded engagement with bores 46 and 47 of the nut block 48, have been withdrawn from bores 43 and 44 of lower flange 11 and from bores 61 and 62 of bracket 53. Bracket 53 has been separated from engagement with adapter element 26 which has been removed from recess 17, and the mounting portion 51 of shaft 52 has been withdrawn from bore 54 of bracket 53.

From the foregoing detailed description it will be apparent that an improved mounting structure has been disclosed wherein a truck wheel shaft is rigidly connected in load bearing relationship on the dimensionally irregular mounting portion of the truck frame assembly without inducing undesirable stresses into the shaft thereby adversely affecting the fatigue life of the shaft and without bending or deflecting the shaft tending to unevenly load the antifriction bearings resulting in excessive wear and short life. Also provided is an optimum contact area between the bearing surface of the truck wheel assembly and the truck frame assembly which will produce a tight trouble free connection.

It is to be understood that although only two embodiments of the invention have been shown and described in detail, it is not intended to limit the patent granted hereon otherwise than is necessitated by the scope of the appended claims.

What is claimed is:

1. A truck wheel shaft mounting for a self-laying track unit, the combination comprising: a pair of longitudinally extending truck frame members being rigidly interconnected and having downwardly facing mounting portions respectively; a pair of transversely spaced recesses formed respectively on said mounting portions; flat coplanar first bearing surfaces presented by the bottom portions of said recesses respectively; a truck wheel shaft having an axis parallel to the plane of said first bearing surfaces; an attaching portion on each end of said shaft in underlying relation respectively to said recesses; a pair of split brackets each having a bore for receiving the respective attaching portions of said shaft; a second flat bearing surface formed on each of said brackets in spaced parallel relation from each of said first bearing surfaces respectively; a pair of adapter elements respectively having a uniform thickness greater than the depth of said recesses, said adapter elements respectively being retained in said recesses in thrust transmitting relationship between said first and second bearing surfaces; and releasable connecting means associated respectively with said brackets and said truck frame members for maintaining said brackets, shaft, adapter element and truck frame members in complementary load transmitting relationship.

2. A shaft mounting for a self-laying track unit, the combination comprising: a pair of longitudinally extending truck frame members being rigidly connected and having downwardly facing mounting portions respectively; a pair of transversely spaced recesses formed respectively on said mounting portions, flat coplanar bearing surfaces presented by the bottom portions of said recesses respectively; a shaft having an attaching portion at opposite ends, said ends being disposed in underlying relationship respectively with said recesses; a pair of flat adapter elements of uniform thickness greater than the depth of said recesses being respectively carried in said recesses in abutting relationship with said coplanar bearing surfaces; a pair of brackets respectively cooperatively embracing the mounting portions of said shaft, said brackets respectively having flatted portions positioned in abutting relationship with said adapter elements respectively; and releasable connecting means associated respectively with said brackets and said truck frame members for maintaining said brackets, shaft, adapter elements and truck frame members in complementary load transmitting relationship.

3. A shaft mounting for a self-laying track unit, the combination comprising: a pair of longitudinally extending truck frame members being rigidly interconnected and having downwardly facing mounting portions respectively; a pair of transversely spaced recesses formed respectively in said mounting portions, the bottom portions of said recesses respectively providing flat coplanar bearing surfaces; a pair of flat adapter elements having a uniform thickness greater than the depth of said recesses, said adapter elements respectively being carried in said recesses and having one flat side juxtaposed with said coplanar bearing surfaces respectively; a shaft having opposite ends disposed in over-lapping relationship with said adapter elements respectively, said shaft having a flatted portion formed on each end, said flatted portions being disposed in abutting relationship respectively with the other flat side of said adapter elements; and means associated with said shaft and truck frame members for releasably maintaining said shaft, adapter elements and truck frame members in complementary load bearing relationship with one another.

References Cited in the file of this patent
UNITED STATES PATENTS

| | | |
|---|---|---|
| 2,690,933 | Bechman | Oct. 5, 1954 |
| 2,809,077 | Christensen | Oct. 8, 1957 |
| 2,834,639 | Herr | May 13, 1958 |